March 19, 1929.   H. E. WHITE   1,705,694
TEMPERATURE REGULATOR
Filed July 1, 1924
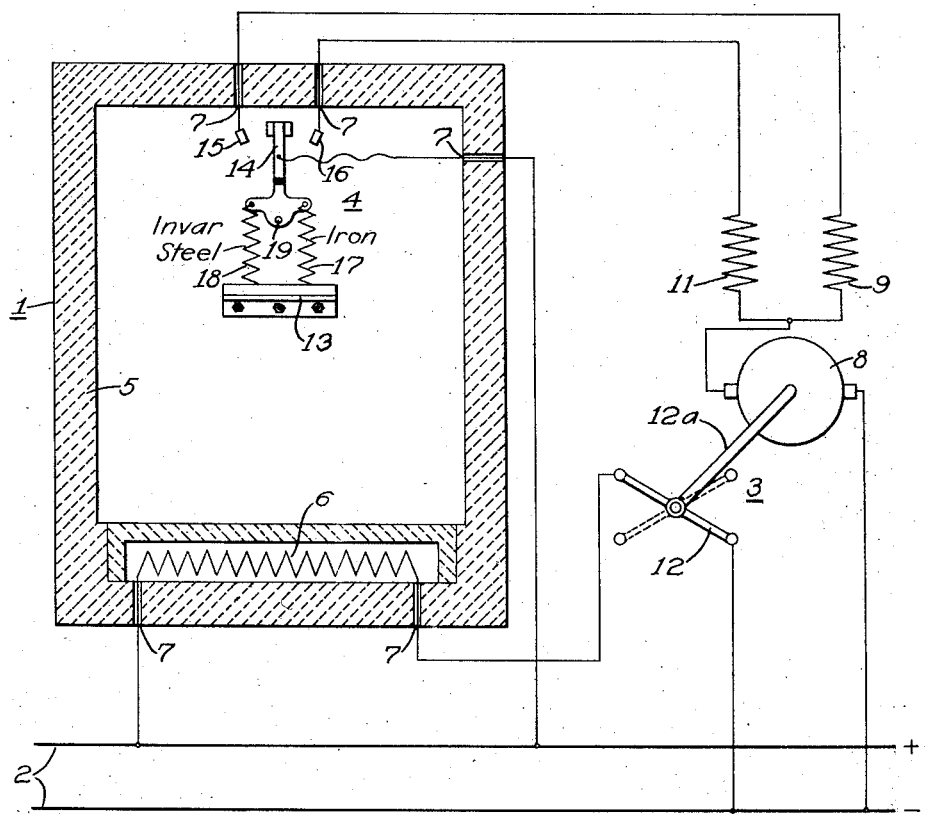
WITNESSES:
G. S. Neilson
L. J. Budlong
INVENTOR
Harold E. White
BY
Wesley G. Carr
ATTORNEY Patented Mar. 19, 1929.

1,705,694

UNITED STATES PATENT OFFICE.

HAROLD E. WHITE, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE REGULATOR.

Application filed July 1, 1924. Serial No. 723,476.

My invention relates to thermal control systems and particularly to thermostatic regulators.

One object of my invention is to provide a thermostatic regulator that shall operate in accordance with changes in the moduli of elasticity of its component parts.

Another object of my invention is to provide a thermostatic regulator that shall operate in accordance with the change of elongation of certain materials when subjected to different temperatures.

It is a well known fact that the modulus of elasticity of most materials decreases when they are subjected to increasing temperatures whereby the tension exerted by a coil of such materials decreases when heated. It is also a well known fact that the tension of other materials, such as invar steel, increases within predetermined limits under similar circumstances. It is the purpose of my invention to oppose coils of material having these different properties in such manner that changes in their moduli of elasticity control a temperature translating device.

The accompanying drawing is a diagrammatic view of circuits and apparatus embodying my invention.

My invention comprises, in general, a thermal translating device 1, such as an electrical oven, a source of electrical energy 2, a motor-operated switch 3 for controlling the energy transmitted from the source 2 to the translating device 1 and a thermostatic regulator 4 embodying my invention for controlling the motor-operated switch.

The translating device 1 comprises walls 5 of heat insulating material in one of which is mounted a resistor or heating element 6 for the translation of electrical energy to thermal energy. The walls 5 are provided with suitable openings 7 for the entrance of electrical conductors.

The motor-operated snap switch 3 comprises a motor 8 having field windings 9 and 11 so disposed as to cause the motor to rotate in opposite directions when they are alternately energized and a switch arm 12 that is connected by a shaft 12ª to the motor 8.

The thermostat 4 comprises a base member 13 that is mounted on one of the walls 5, and a pivotally-mounted contact member 14 cooperating with stationary contact members 15 and 16 that are connected to the field windings 9 and 11, respectively. The contactor 14 is connected to the base 13 by a pair of coiled springs 17 and 18 composed of different materials, each having a different temperature coefficient of modulus of elasticity. The coil spring 17 may consist of ordinary iron wire whose modulus of elasticity decreases with an increase of temperature because iron has a negative temperature coefficient of modulus of elasticity. The coil spring 18 may consist of a metal having a different modulus of elasticity than the coil 17, preferably invar steel, the modulus of elasticity of which actually increases with the increase of temperature within certain limits for invar steel has a positive temperature coefficient of modulus of elasticity.

If a weight is attached to the free end of a coiled spring of invar steel, the other end remaining fixed, the spring will stretch or elongate in a well-known manner, the elongation being a function of the characteristic of the spring and the size of the weight. It has been determined by experiment that if the spring is heated to approximately 100° C. from normal room temperature while elongated, then the spring will become shorter by an amount equal to approximately 3% of the amount by which it was elongated at room temperature. This characteristic results from the fact that the spring becomes stiffer because of its increase in modulus of elasticity; therefore, by way of example, if a given weight (of 33 pounds) is required to stretch a given spring of invar steel three inches at 25° C., then the same weight will stretch the same spring 2.91 inches at 100° C.

The same characteristic has been found to be true of springs of iron material in a negative sense. If a given weight is applied to a spring of iron wire, the spring will elongate a certain amount, but, if the spring is heated the elongation will increase because the modulus of elasticity decreases and, as a result of which, the spring becomes weaker.

Since the springs 17 and 18 are stretched between the contactor 14 and the base 13 increases or decreases in the modulus of elasticity will cause the contactor 14 to turn about its pivot 19. The points of connection between the springs 17, 18 and the contactor 14 may be so disposed with relation to the pivot point 19 that movements of the springs 17, 18 are multiplied and may even impart a slight snap motion thereto, although I do not propose that such movement shall be carried far enough to cause the center line of these springs to cross the pivot point 19 far enough to prevent their automatic return to the position shown. The springs 17 and 18 in addition to being always under tension, should generally be so disposed that the contactor 14 remains in a mid-position relative to the stationary contact members 15 and 16 at a desired temperature.

It may be assumed that the temperature of the translating device rises above a predetermined value. The modulus of elasticity and, accordingly, the stiffness of the coil spring 17, which is of iron, are diminished; therefore, the spring 17 elongates. The modulus of elasticity of the coil spring 18, which is of different material, changes at a different rate and the result is to unbalance the tensions of the coils. If the coil spring 18 is of invar steel, and the coil 17 of iron, the spring 18 becomes stronger and the spring 17 weaker as the temperature increases. Such unbalancing in the strengths of the springs 17 and 18 results in a counter-clockwise movement of the contactor 14 until the stationary contact member 15 is engaged, whereupon a circuit is completed that extends from one of the conductors of the source 2 through the contactor 14 and stationary contact member 15, the field winding 9 and motor 8 to the other conductor of the source 2. The motor 8 is thereby actuated to disconnect the heating element 6 from the source 2 at the switch arm 12.

The temperature of the translating device 1 thereupon falls and the modulus of elasticity of the coil spring 17 increases while that of the coil spring 18 remains substantially constant or decreases, according to its material, with the result that the circuit is interrupted between the contactor 14 and the stationary contact member 15 and the motor brought to rest. It is to be understood that suitable pilot switches and limit switches may be interposed between the motor 8 and the source 2 in order to bring the motor to rest at the proper position and prevent a continuous operation of the switch arm 12. Such devices being well known in the art, it is not believed to be necessary to include a discussion thereof in the present application.

If the translating device 1 cools sufficiently, the modulus of elasticity of the spring 17 will increase to such point that the contactor 14 is brought into engagement with the stationary contact member 7. A circuit is thereupon completed between one of the conductors of the source 2 through the contactor 14, the stationary contact member 7, the coil 11 and the motor 8 to the other conductor of the source 2, whereupon the switch arm 12 is brought into position to complete the circuit for the resistor 6. The foregoing cycle of operations may be continued indefinitely so long as the temperature of the translating device 1 is maintained within the operating range of the springs 17 and 18.

It is to be understood that any form of resilient balancing in which the moduli of elasticity of different materials are utilized for the purpose of operating the thermostatic regulator is included within the term spring, as heretofore applied. It is not necessary that the spring should be of coil form, as flat springs might be used equally well.

It will be seen that I have provided a thermostatic regulator which depends for its operation upon the changes in the moduli of elasticity of different materials when they are subjected to temperature changes. The regulator is also useful in refrigeration systems when small temperature changes occur over an appreciable length of time.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claim.

I claim as my invention:

In a thermostatic regulator, a plurality of relatively movable contact members, one of said contact members being pivotally mounted, a plurality of springs having different temperature coefficients of moduli of elasticity, means for supplying said springs with a continuous elongating force, and means for utilizing elongations of said springs to actuate said pivotally mounted contact member responsive to changes in moduli of elasticity in one or all of said springs resulting from changes in temperature.

In testimony whereof, I have hereunto subscribed my name this 11th day of June, 1924.

HAROLD E. WHITE.